United States Patent
Hope et al.

(10) Patent No.: US 12,056,888 B2
(45) Date of Patent: Aug. 6, 2024

(54) METHODS AND APPARATUSES FOR CALCULATING BUILDING HEIGHTS FROM MONO IMAGERY

(71) Applicant: Intermap Technologies, Inc., Englewood, CO (US)

(72) Inventors: Ralph Mark Hope, Chestfield (GB); Nathan Zachary Mercer, Englewood, CO (US); Qiaoping Zhang, Englewood, CO (US)

(73) Assignee: INTERMAP TECHNOLOGIES, INC., Englewood, CO (US)

( * ) Notice: Subject to any disclaimer, the term of this patent is extended or adjusted under 35 U.S.C. 154(b) by 288 days.

(21) Appl. No.: 17/467,736

(22) Filed: Sep. 7, 2021

(65) Prior Publication Data
US 2023/0073366 A1    Mar. 9, 2023

(51) Int. Cl.
*G06T 7/60* (2017.01)
*G06T 7/13* (2017.01)

(52) U.S. Cl.
CPC .............. *G06T 7/60* (2013.01); *G06T 7/13* (2017.01); *G06T 2207/20081* (2013.01); *G06T 2207/20084* (2013.01); *G06T 2207/30184* (2013.01)

(58) Field of Classification Search
CPC ... G06T 7/60; G06T 7/13; G06T 2207/20081; G06T 2207/20084; G06T 2207/30184; G06T 7/12; G06T 7/62; G06T 5/006
See application file for complete search history.

(56) References Cited

U.S. PATENT DOCUMENTS

| | | |
|---|---|---|
| 5,109,430 A | 4/1992 | Nishihara |
| 5,187,754 A | 2/1993 | Currin |
| 5,926,581 A | 7/1999 | Pritt |
| 6,272,448 B1 | 8/2001 | Ishii |
| 6,448,544 B1 | 9/2002 | Stanton |
| 6,757,445 B1 | 6/2004 | Knopp |

(Continued)

FOREIGN PATENT DOCUMENTS

| | | |
|---|---|---|
| WO | WO2008034465 A1 | 3/2008 |
| WO | WO2010056643 A2 | 5/2010 |

OTHER PUBLICATIONS

Notice of Allowance in U.S. Appl. No. 17/068,214, mailing date Aug. 16, 2022, 9 pages.

(Continued)

*Primary Examiner* — Qian Yang
(74) *Attorney, Agent, or Firm* — Perkins Coie LLP (57) ABSTRACT

A technique is directed to methods and systems for calculating building heights from mono imagery. In some implementations, a building height calculation system performs orthorectification of an image of buildings against a digital terrain model to remove effects of terrain distortion from the image. The building height calculation system can execute an edge detection algorithm on the image to identify the edges of the building in the image. The edges can provide a rooftop vector of the building. The building height calculation system can execute, using image data at input, a machine learning algorithm to determine the footprint vector of the building in the image. The building height is calculated based on a camera angle, a distance from the camera to the building, and a pixel offset from the footprint vector to the rooftop vector.

15 Claims, 10 Drawing Sheets

(56) References Cited

U.S. PATENT DOCUMENTS

| | | | |
|---|---|---|---|
| 6,792,684 B1 | 9/2004 | Hyyppa |
| 6,937,775 B2 | 8/2005 | Gindele |
| 6,973,218 B2 | 12/2005 | Alderson |
| 6,978,050 B2 | 12/2005 | Hunter |
| 7,013,235 B2 | 3/2006 | Hyyppa |
| 7,043,090 B2 | 5/2006 | Gindele |
| 7,116,838 B2 | 10/2006 | Gindele |
| 7,187,452 B2 | 3/2007 | Jupp |
| 7,236,649 B2 | 6/2007 | Fenney |
| 7,386,164 B2 | 6/2008 | Shragai |
| 7,477,777 B2 | 1/2009 | Wells |
| 7,627,491 B2 | 12/2009 | Feyen |
| 7,639,842 B2 | 12/2009 | Kelle |
| 7,856,312 B2 | 12/2010 | Coombes |
| 7,881,913 B2 | 2/2011 | O'Neil |
| 7,917,292 B1 | 3/2011 | Du |
| 7,917,346 B2 | 3/2011 | Sullivan |
| 8,010,294 B2 | 8/2011 | Dorn |
| 8,139,111 B2 | 3/2012 | Oldroyd |
| 8,208,689 B2 | 6/2012 | Savolainen et al. |
| 8,239,179 B2 | 8/2012 | Duncan |
| 8,295,554 B2 | 10/2012 | Francini et al. |
| 8,369,579 B2 | 2/2013 | Barnes |
| 8,473,264 B2 | 6/2013 | Frigerio |
| 8,543,430 B1 | 9/2013 | Fields et al. |
| 8,615,362 B2 | 12/2013 | Laake |
| 8,655,595 B1 | 2/2014 | Green et al. |
| 8,718,393 B2 | 5/2014 | Chen |
| 8,825,456 B2 | 9/2014 | Vasudevan |
| 8,855,439 B2 | 10/2014 | Louis |
| 8,874,187 B2 | 10/2014 | Thomson |
| 9,147,285 B2 | 9/2015 | Kunath |
| 9,245,196 B2 | 1/2016 | Marks |
| 9,299,191 B2 | 3/2016 | Sinram et al. |
| 9,418,475 B2 | 8/2016 | Medioni |
| 9,436,987 B2 | 9/2016 | Ding |
| 9,589,362 B2 | 3/2017 | Sarkis |
| 9,830,690 B2 | 11/2017 | Chiang |
| 9,866,815 B2 | 1/2018 | Vrcelj |
| 9,875,554 B2 | 1/2018 | Imber |
| 9,904,867 B2 | 2/2018 | Fathi |
| 9,911,242 B2 | 3/2018 | Sundaresan |
| 9,912,862 B2 | 3/2018 | Peruch |
| 10,002,407 B1 | 6/2018 | Mercer |
| 10,078,913 B2 | 9/2018 | Rondao |
| 10,147,057 B2 | 12/2018 | Zhang |
| 10,186,015 B1 | 1/2019 | Mercer |
| 10,204,454 B2 | 2/2019 | Goldman et al. |
| 10,304,203 B2 | 5/2019 | Forutanpour |
| 10,325,349 B2 | 6/2019 | Mercer et al. |
| 10,354,411 B2 | 7/2019 | Fu |
| 10,430,641 B2 | 10/2019 | Gao |
| 10,452,789 B2 | 10/2019 | Madmony |
| 10,553,020 B1* | 2/2020 | Hainline ................ G06T 15/60 |
| 10,579,875 B2 | 3/2020 | Dal Mutto |
| 10,636,209 B1 | 4/2020 | Thaller et al. |
| 10,636,219 B2 | 4/2020 | Steinbrucker |
| 10,699,421 B1 | 6/2020 | Cherevatsky |
| 10,733,798 B2 | 8/2020 | Wagner |
| 10,817,752 B2 | 10/2020 | Kehl |
| 10,825,217 B2 | 11/2020 | Ulusoy |
| 10,930,074 B2 | 2/2021 | Fu |
| 10,937,178 B1 | 3/2021 | Srinivasan |
| 10,937,188 B2 | 3/2021 | Malisiewicz |
| 10,970,518 B1 | 4/2021 | Zhou |
| 11,244,189 B2 | 2/2022 | Fathi |
| 11,551,366 B2 | 1/2023 | Griffiths et al. |
| 2003/0138152 A1 | 7/2003 | Fennye |
| 2004/0260471 A1 | 12/2004 | McDermott |
| 2008/0260237 A1 | 10/2008 | Savolainen et al. |
| 2010/0292973 A1 | 11/2010 | Barnes |
| 2011/0246935 A1 | 10/2011 | Maeder |
| 2011/0295575 A1 | 12/2011 | Levine et al. |
| 2012/0330553 A1 | 12/2012 | Mollaei |
| 2013/0046471 A1 | 2/2013 | Rahmes |
| 2013/0155109 A1 | 6/2013 | Schultz et al. |
| 2013/0197807 A1 | 8/2013 | Du |
| 2013/0342736 A1 | 12/2013 | Numata |
| 2014/0046627 A1 | 2/2014 | Pershing |
| 2014/0267250 A1 | 9/2014 | Tennant |
| 2014/0301633 A1 | 10/2014 | Furukawa et al. |
| 2015/0046139 A1 | 2/2015 | Iwamura |
| 2015/0154805 A1 | 6/2015 | Hsu |
| 2015/0370929 A1 | 12/2015 | Pershing |
| 2016/0148347 A1 | 5/2016 | Guido |
| 2016/0196659 A1 | 7/2016 | Vrcelj |
| 2016/0239924 A1 | 8/2016 | Fields et al. |
| 2016/0321818 A1 | 11/2016 | Shorter |
| 2016/0366348 A1 | 12/2016 | Dixon |
| 2017/0154127 A1 | 6/2017 | Madmony |
| 2017/0358067 A1 | 12/2017 | Jung |
| 2018/0165616 A1 | 6/2018 | Sun et al. |
| 2019/0108396 A1 | 4/2019 | Dal Mutto |
| 2019/0213389 A1 | 7/2019 | Peruch |
| 2019/0259202 A1 | 8/2019 | Taubin |
| 2020/0134733 A1 | 4/2020 | Maddox |
| 2020/0320327 A1 | 10/2020 | Fathi |
| 2020/0348132 A1 | 11/2020 | Du et al. |
| 2021/0104182 A1 | 4/2021 | Miller |
| 2021/0110564 A1 | 4/2021 | Mantey |
| 2021/0118224 A1 | 4/2021 | Zhan |
| 2021/0158609 A1 | 5/2021 | Raskob |
| 2022/0108521 A1* | 4/2022 | Sameer ................ G06T 19/00 |
| 2023/0082413 A1 | 3/2023 | Zhang et al. |

OTHER PUBLICATIONS

Notice of Allowance in U.S. Appl. No. 17/193,277, mailing date Sep. 8, 2022, 10 pages.

Snavley, N. et al., "Modeling the World from Internet Photo Collections." Int. J. Comput Vis (2008) 80: 189-210.

Final Office Action in U.S. Appl. No. 16/664,696, mailing date Jan. 24, 2022, 33 pages.

International Search Report and Written Opinion mailed Jan. 24, 2022 in International Patent Application No. PCT/US21/54498, 11 pages.

Non-Final Office Action in U.S. Appl. No. 16/664,696, mailing date Sep. 20. 2021, 26 pages.

Krizhevsky, A. et al., "ImageNet Classification with Deep Convolutional Neural Networks." Jun. 2017, 9 pages.

Non-Final Office Action in U.S. Appl. No. 14/825,806, mailing date Dec. 1, 2017, 13 pages.

Non-Final Office Action in U.S. Appl. No. 15/963,937, mailing date May 31, 2018, 10 pages.

Non-Final Office Action in U.S. Appl. No. 16/398,027, mailing date Aug. 6, 2019, 8 pages.

Notice of Allowance in U.S. Appl. No. 14/825,806, mailing date Jul. 11, 2018, 12 pages.

Notice of Allowance in U.S. Appl. No. 14/825,806, mailing date Sep. 4, 2018, 11 pages.

Notice of Allowance in U.S. Appl. No. 15/723,154, mailing date Jan. 26, 2018, 9 pages.

Notice of Allowance in U.S. Appl. No. 15/963,937, mailing date Sep. 19, 2018, 8 pages.

Notice of Allowance in U.S. Appl. No. 16/221,859, mailing date Jan. 29, 2019, 10 pages.

Notice of Allowance in U.S. Appl. No. 16/398,027, mailing date Sep. 24, 2019, 7 pages.

International Search Report and Written Opinion mailed Jan. 27, 2023 in International Patent Application No. PCT/US22/42783, 14 pages.

Non-Final Office Action in U.S. Appl. No. 17/473,704, mailing date Jan. 11, 2024, 28 pages.

* cited by examiner

METHODS AND APPARATUSES FOR CALCULATING BUILDING HEIGHTS FROM MONO IMAGERY

BACKGROUND

In some cases, to find out the height of a building an individual must access records (e.g., building plans, city documents, etc.) but this is not practical on a larger scale, such as measuring all buildings in a city. Building heights cannot currently be measured with mono two-dimensional (2D) aerial imagery or satellite imagery, due to the imagery not containing true three-dimensional (3D) information. Traditionally stereo pairs of 2D imagery have been used to measure building heights, but these stereo pairs are seldom available "off the shelf" and must often be tasked specifically for a job, which can lead to increased costs.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for calculating building heights from mono imagery. Light detection and ranging (LiDAR) scanning and stereo photogrammetry are used (e.g., in digital surface models (DSMs)) to measure building heights. LiDAR can be cost prohibitive and challenging to use in many regions. Stereo photogrammetry relies on having stereo pairs of images which are not always available and more expensive than mono imagery. Satellites, planes, and aerial vehicles can capture an image of a building, and a building height calculation system can determine the height of the building in the image. The disclosed method utilizes techniques to identify the footprint and rooftop of a building (e.g., rooftop vectors and footprint vectors) in an image, determine the horizontal offset separating the footprint and rooftop, and calculate the height of the building based on the horizontal offset and the angle the image was captured from. "Building" as used herein can refer to any structure or object in terrain. Note that while this description will refer to a single building, the singular implicates the plural and multiple buildings could be involved.

Figure 1:
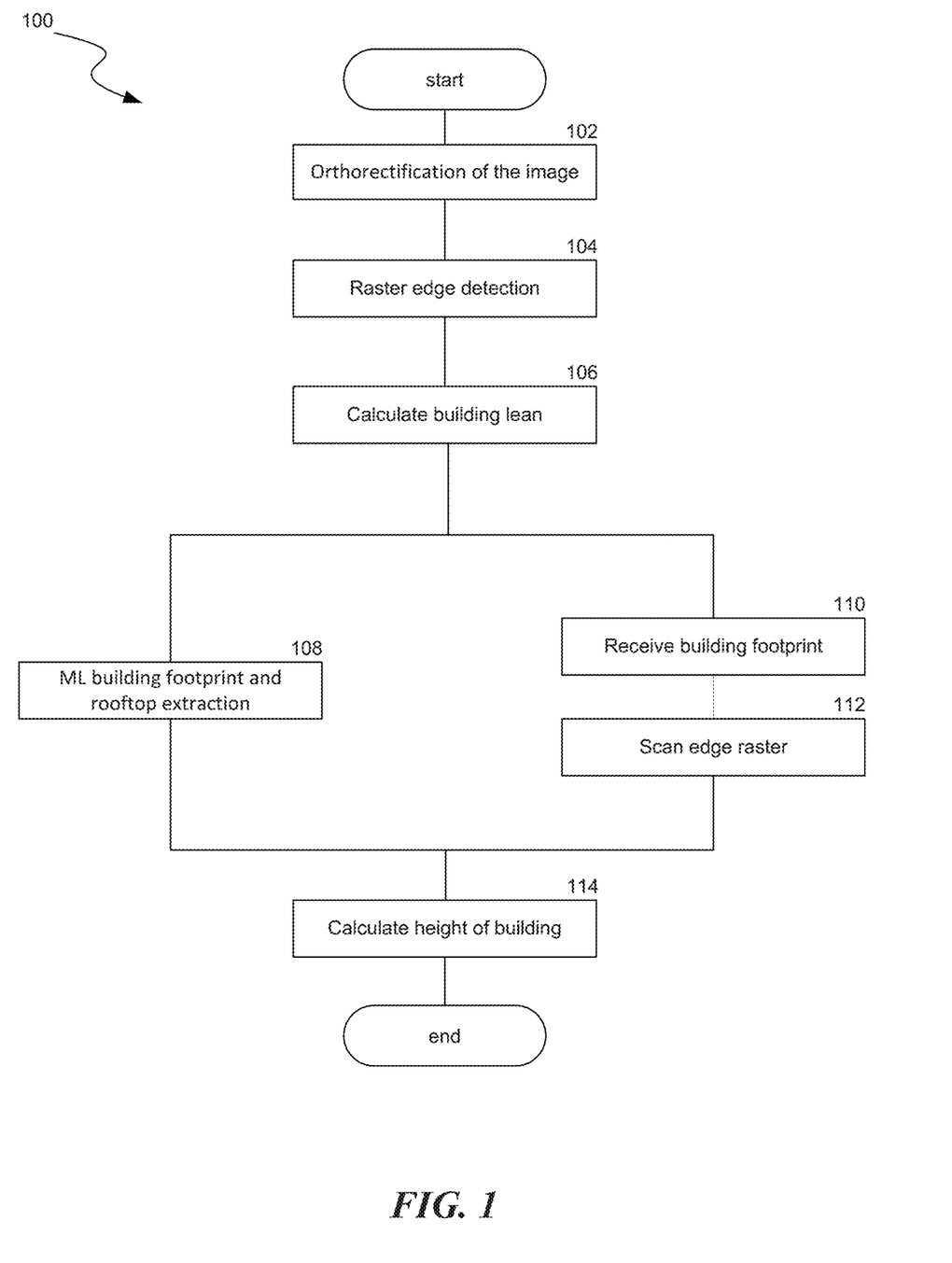
FIG. 1 is a flow diagram illustrating a process used in some implementations for calculating building heights.
Figure 3:
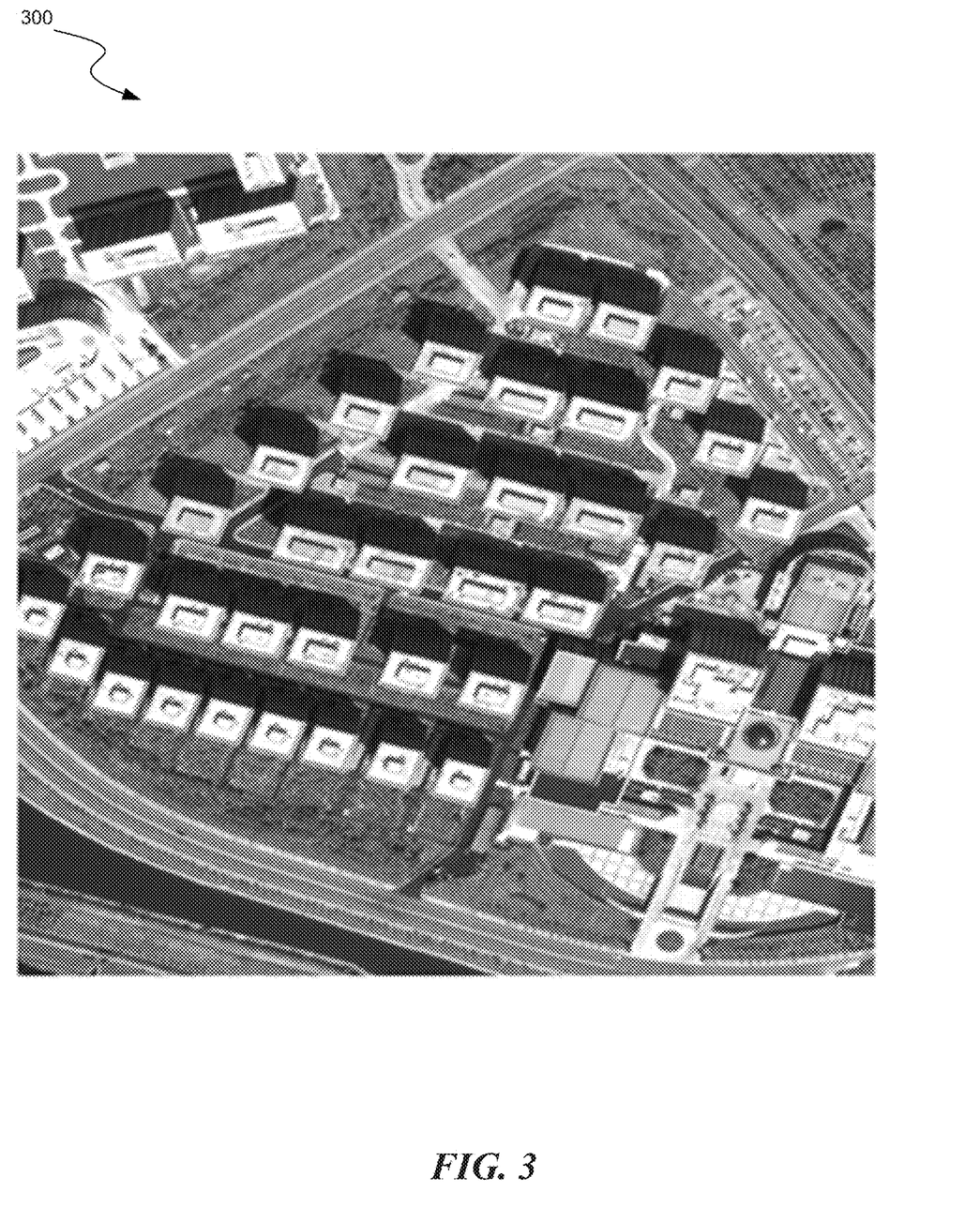
FIG. 3 is an illustration of satellite image of buildings.

Several implementations are discussed below in more detail in reference to the figures. FIG. 1 is a flow diagram illustrating a process 100 used in some implementations for calculating building heights. In an embodiment, process 100 is triggered by a camera capturing an image (e.g., of buildings), a user inputting a command, or, when receiving images of terrain. The camera(s) capturing the images can be mounted on a satellite, plane, drone, or any aerial vehicle. Image 300 (e.g., a 2D satellite image) in FIG. 3 illustrates an aerial view of terrain with multiple buildings. In some implementations, digital elevation models (DEMs) represent the "bare earth" elevation, from which surface features such as trees and buildings have been removed. Either a digital surface model (DSM) or a digital terrain model (DTM) may be referred to as a DEM. Since no remote sensing mapping system provides direct measurements of the bare earth, a DTM is mostly produced by editing of the DSM. Process 100 can use an image and DTM as input data and process the data to determine the heights of the buildings in the image. In some embodiments, a DTM is a method to determine a ground elevation for the eventual determination of a building elevation.

At step 102, process 100 performs orthorectification of the image against the DTM to remove effects of terrain distortion from the image. Orthorectification to a DTM is a process in earth imaging, in which the map (geographic or projected) coordinates of each pixel in an image of the earth are identified with the aid of a source DTM. This allows the formation of a new image. As a result of applying orthorectification, one or more pixels in the new image can be placed in its correct position(s) with respect to map coordinates.

Figure 4:
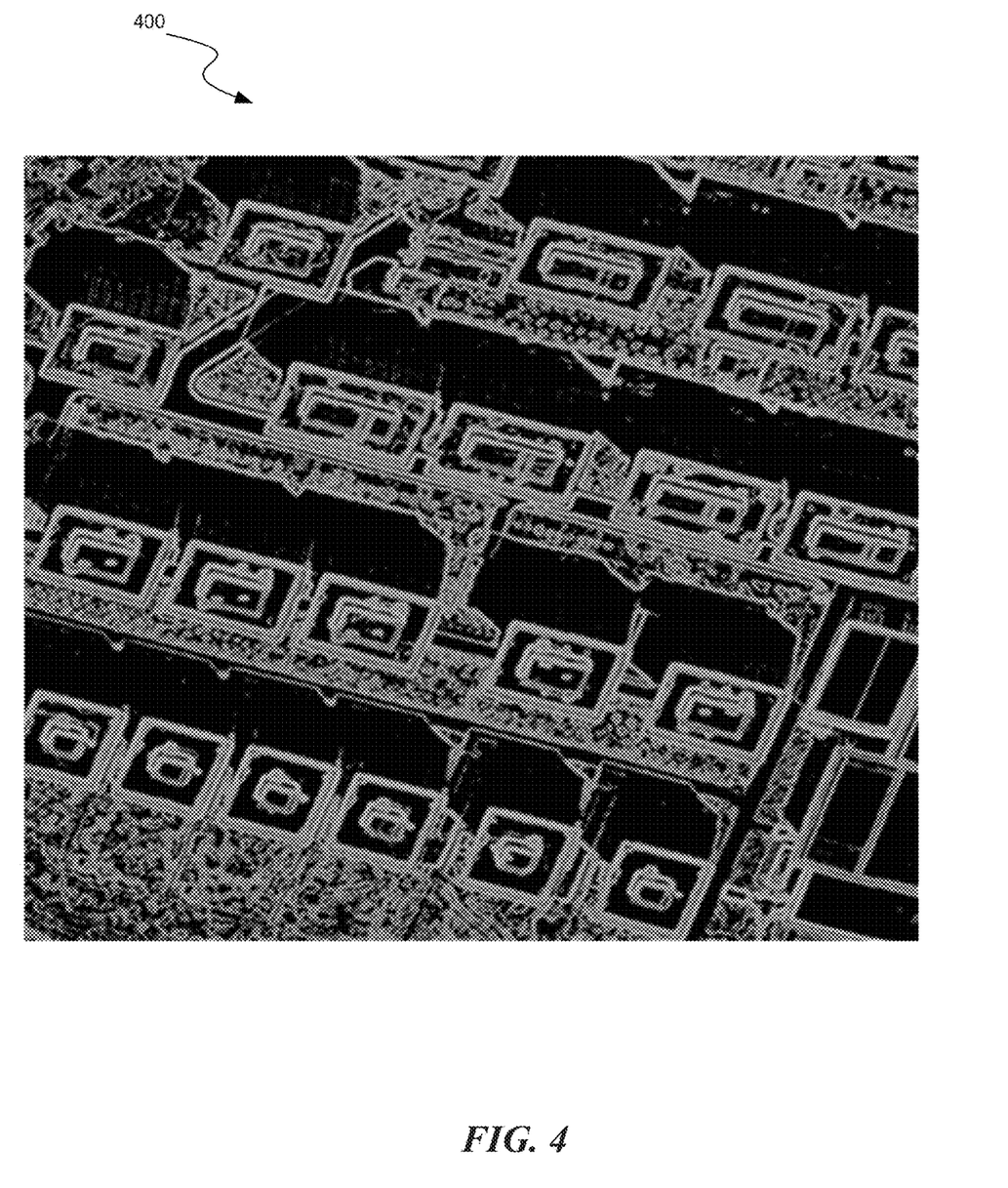
FIG. 4 is an illustration of a raster edge mask created from the satellite image of buildings.

At step 104, process 100 can execute an edge detection algorithm on the image to identify the edges (e.g., contrast changes) of the building in the image. FIG. 4 is an example of a Sobel-Feldman operator, however any common edge detection algorithm can be used. The edges can provide a rooftop vector on the building. Process 100 can export the edges to a raster file. The edge detection algorithm can produce outlines of the rooftops of buildings. Image 400 of FIG. 4 illustrates a raster edge mask created from image 300.

Figure 5:
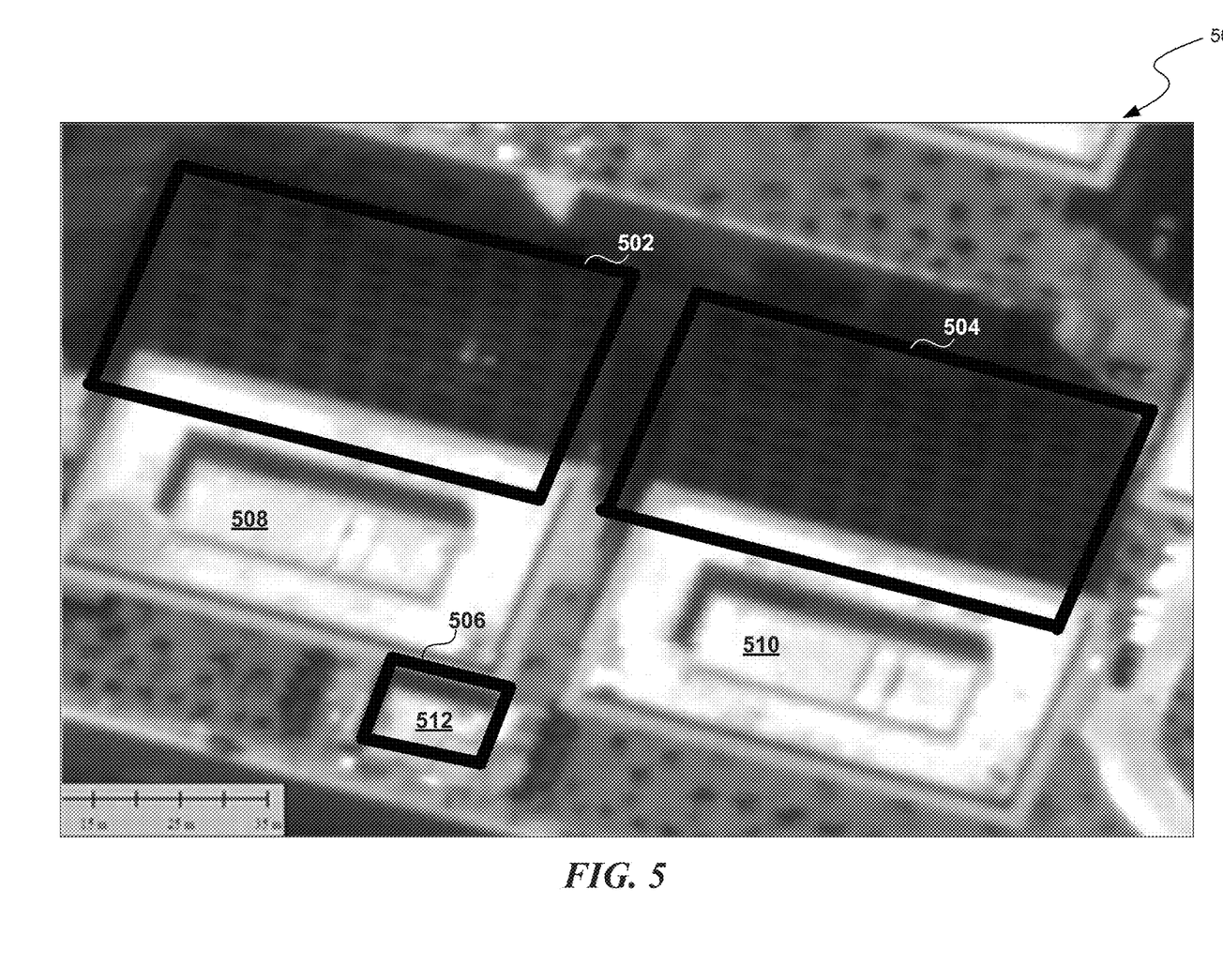
FIG. 5 is an illustration of building footprint vectors.

At step 106, process 100 calculates a building lean direction based on image meta data of the angle the camera was facing when the image was captured. At step 108, process 100 executes a machine learning algorithm to determine the footprint and rooftop vectors of the building in the image. Process 100 can convert the image into an input for a machine learning model, apply the input to the machine learning model, and in response obtaining the rooftop vector and the footprint vector of the building based on output from the machine learning model. Additional details on machine leaning are described in FIG. 10. At step 110, process 100 receives the footprint vector and rooftop vector of the building from a third party (e.g., company, organization, documents, etc.). Example 500 of FIG. 5 illustrates footprint vector 502 of building 508, footprint vector 504 of building 510, and footprint vector 506 of building 512.

At step 112, process 100 executes an algorithm with the building footprint vector and scans the edge raster in the direction along a search corridor (e.g., 2 or 3 pixels wide). Process 100 can identify a connection between the building footprint and the edge raster. For example, the connection is expected to occur at the rooftop of the building. Process 100 can search for the highest correlation between the rooftop and footprint vectors rather than an exact match, so inaccuracies (e.g., small inaccuracies, such as 95% accuracy) in the building footprint vectors do not affect the detection of the rooftop vector. Process 100 can perform a correlation calculation between the rooftop and footprint vectors. For example, process 100 uses the building footprint vector as a template and the edge raster as the comparison image. Process 100 calculates the mean of all the template pixels (MT), the mean of all the image pixels (MI), and loops through each template pixel and image pixel and calculates equation 1 as the correlation (where T and I are the template and image pixel values). Process 100 can perform the calculation at each pixel step along the search corridor and use the highest correlation for the roof position.

$$\text{Sum}((T-MT)*(I-MI))/\text{Sqrt}(\text{Sum}((T-TT)^2)*\text{Sum}((I-TI)^2)) \quad \text{(Equation 1)}$$

Figure 6:
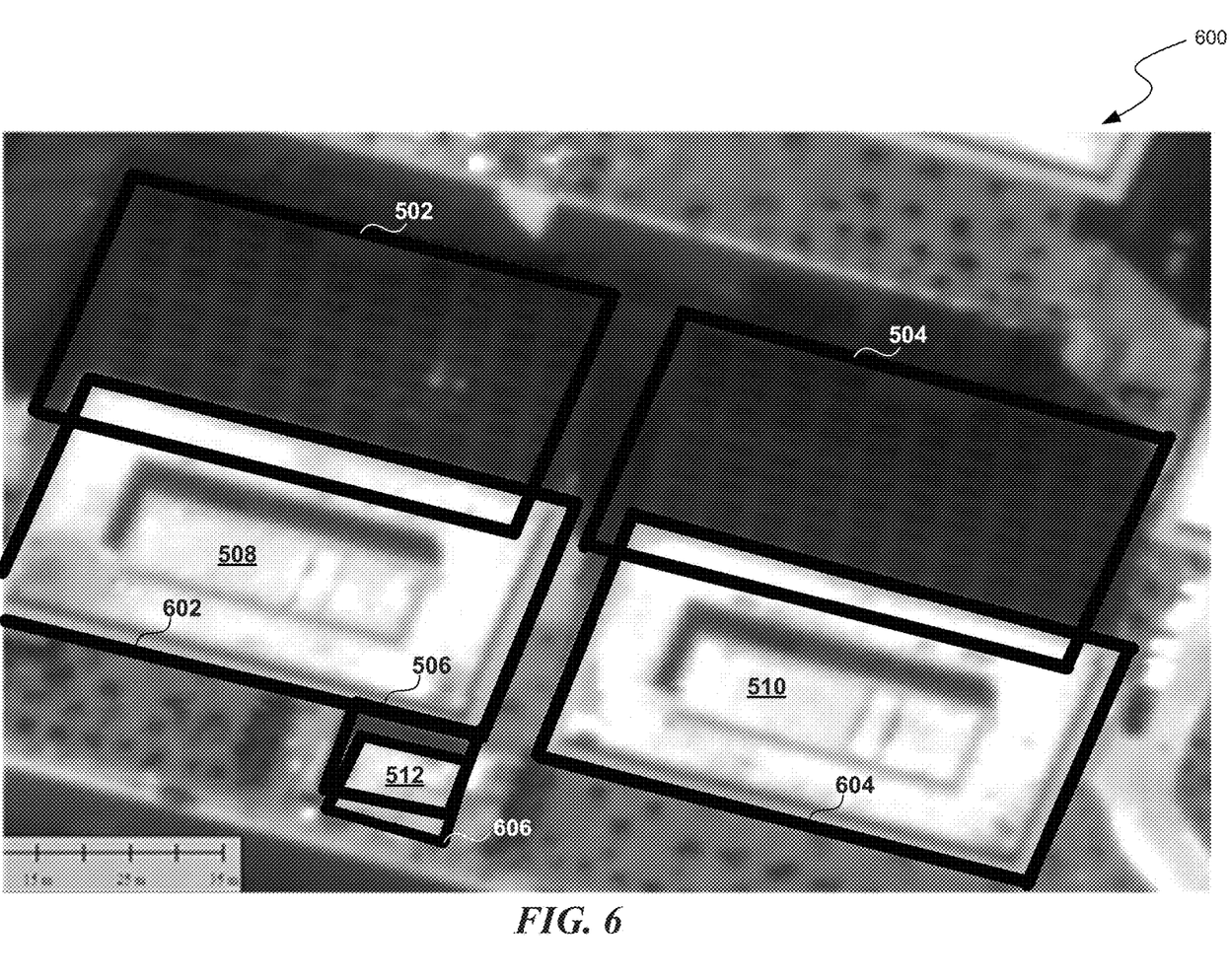
FIG. 6 is an illustration of building rooftop vectors found by comparing the shape from a footprint vector to an edge mask.
Figure 7:
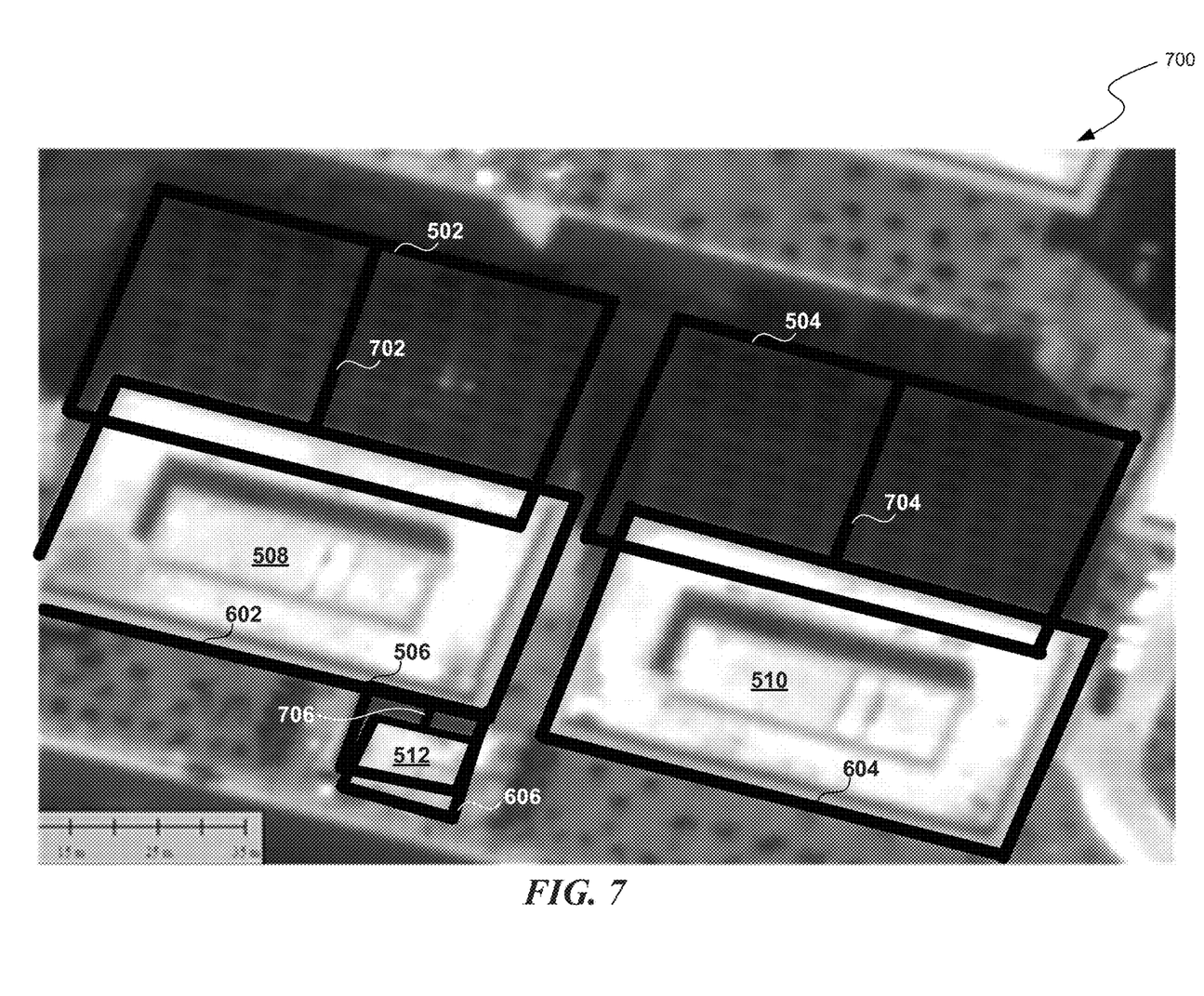
FIG. 7 is an illustration of measuring the pixel offset between a building footprint vector and a rooftop vector.

Example 600 of FIG. 6 illustrates footprint vector 502 and rooftop vector 602 of building 508, footprint vector 504 and rooftop vector 604 of building 510, and footprint vector 506 and rooftop vector 606 of building 512. At step 114, process 100 calculates the building height based on a camera angle, a distance from the camera to the building, and a pixel offset from the footprint vector to the rooftop vector. Process 100 can use a rational polynomial coefficients (RPC) algorithm to calculate the building height. For example, the geometric sensor model describing the physical relationship between image coordinates and ground coordinate is known as a Rigorous Projection Model. A Rigorous Projection Model expresses the mapping of the image space coordinates of rows and columns (r,c) onto the object space reference surface geodetic coordinates (φ, λ, h). RPCs support a generic description of the Rigorous Projection Models. The approximation used by RPCs is a set of rational polynomials expressing the normalized row and column values, ($r_n$, $c_n$), as a function of normalized geodetic latitude, longitude, and height, given a set of normalized polynomial coefficients. Below are a few steps to calculate building heights based on RPCs and the displacement observed between a building footprint and its corresponding building. Step 1: Backproject building footprint's centroid (X,Y,Z) in decimal degrees to input image space via RPCs→(r,c), in which "Z" is from NM6 DTM, averaged from all vertices, "r" is the row index, and "c" is the column index; Step 2: Backproject building rooftop's centroid (X',Y',Z') to input image space via RPCs→(r',c'), in which "Z" is from NM6 DTM, averaged from all vertices; Step 3: Backproject a series of points {X,Y,Z"} with Z" starting from Z, increased by 1.0 m at a time, to input image space via RPCs→{r" c"}, in which the calculation finds the closest (r",c") with respect to (r',c') and the corresponding Z" is the estimated building rooftop height; and Step 4: calculate building height: BH=Z"−Z. Example 700 of FIG. 7 illustrates the pixel offset 702 between the footprint vector 502 and rooftop vector 602 of building 508, the pixel offset 704 between the footprint vector 504 and rooftop vector 604 of building 510, and the pixel offset 706 between the footprint vector 506 and rooftop vector 606 of building 512.

Figure 2:
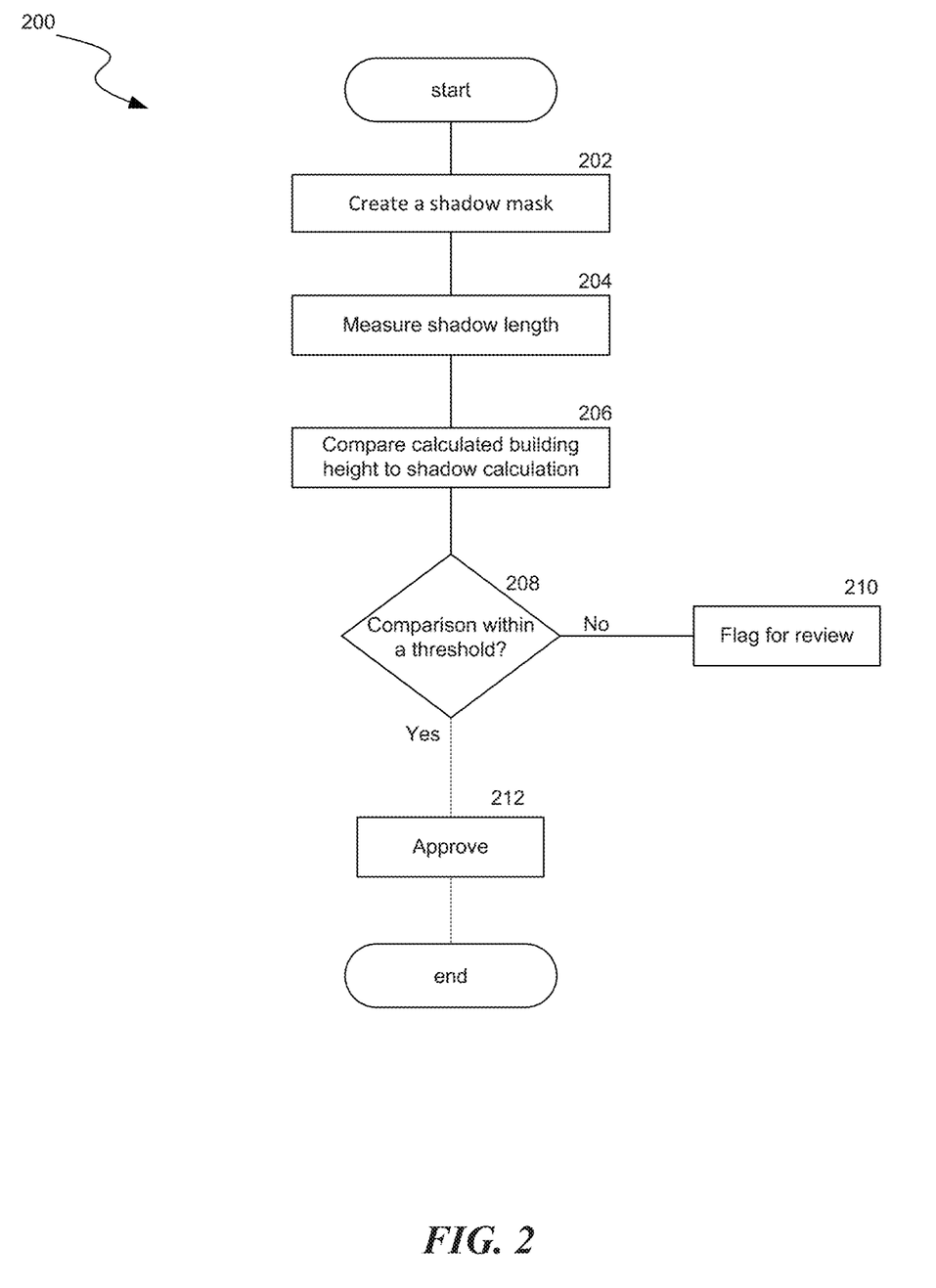
FIG. 2 is a flow diagram illustrating a process used in some implementations for verifying calculated building heights.

FIG. 2 is a flow diagram illustrating a process 200 used in some implementations for verifying calculated building heights. In an embodiment, process 200 is triggered by a camera capturing an image (e.g., buildings), a user inputting a command, receiving images of terrain, or when a building height verification is requested.

At step 202, process 200 creates a shadow mask for the building using the footprint vector as a reference and the image. The shadow mask is created by setting a threshold value on the pixel intensity of the panchromatic image. If the pixel intensity is below the threshold, that pixel is flagged as a shadow. The shadow length is measured by counting the number of flagged shadow pixels in the opposite direction of the sun azimuth, starting from the building footprint.

At step 204, process 200 measures a building height based on the camera angle, the distance from the camera to the building, and the angle of the sun (e.g., from latitude, longitude, and time of day). The relationship between shadow length and building height is as follows: BH=L×tan(θ) where BH is the building height, L is the shadow length to the building footprint, and θ is the sun elevation. Both the sun elevation and azimuth are provided in the image metadata.

At step 206, process 200 compares the shadow building height (from step 204) to the RPC calculated building height (from step 114 of FIG. 1). At step 208, process 200 determines whether the comparison result is within a threshold (e.g., any threshold, such as 1%, 5%, or 10% difference in calculation) amount. For example, the threshold can be a selectable parameter based on the accuracy requirements of the job a user is working on When the comparison results are not within the allowed threshold, at step 210, process 200 flags the building height calculation results for manual review by a user. When the comparison results are within the allowed threshold, at step 212, process 200 approves the building height calculation results and sends a notification (e.g., message, email, alert, etc.) to a user.

Figure 8:
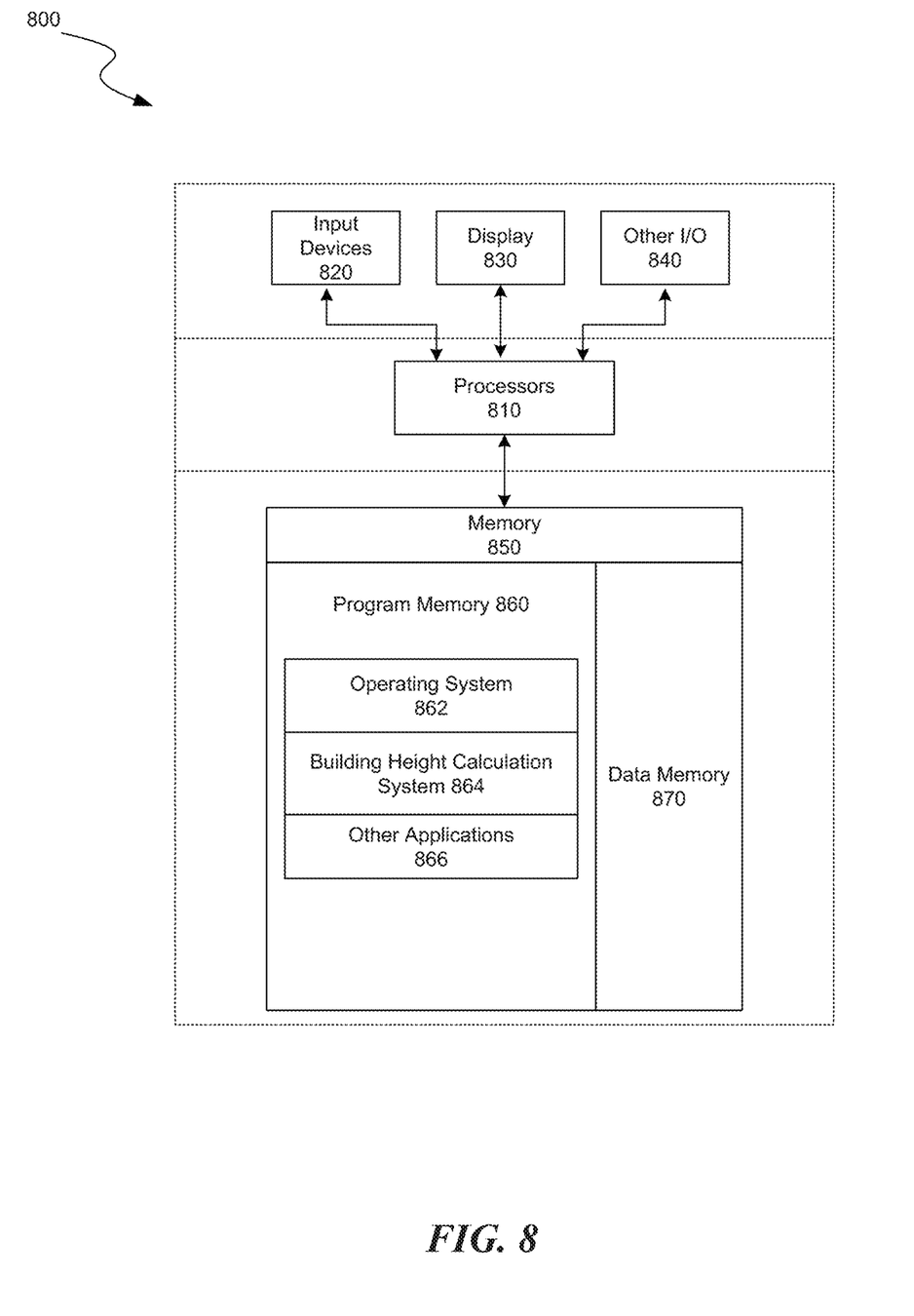
FIG. 8 is a block diagram illustrating an overview of devices on which some implementations can operate.

FIG. 8 is a block diagram illustrating an overview of devices on which some implementations of the disclosed technology can operate. The devices can comprise hardware components of a device 800 that manage entitlements within a real-time telemetry system. Device 800 can include one or more input devices 820 that provide input to the processor(s) 810 (e.g. CPU(s), GPU(s), HPU(s), etc.), notifying it of actions. The actions can be mediated by a hardware controller that interprets the signals received from the input device and communicates the information to the processors 810 using a communication protocol. Input devices 820 include, for example, a mouse, a keyboard, a touchscreen, an infrared sensor, a touchpad, a wearable input device, a camera- or image-based input device, a microphone, or other user input devices.

Processors 810 can be a single processing unit or multiple processing units in a device or distributed across multiple devices. Processors 810 can be coupled to other hardware devices, for example, with the use of a bus, such as a PCI bus or SCSI bus. The processors 810 can communicate with a hardware controller for devices, such as for a display 830. Display 830 can be used to display text and graphics. In some implementations, display 830 provides graphical and textual visual feedback to a user. In some implementations, display 830 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 840 can also be coupled to the processor, such as a network card, video card, audio card, USB, firewire or other external device, camera, printer, speakers, CD-ROM drive, DVD drive, disk drive, or Blu-Ray device.

In some implementations, the device 800 also includes a communication device capable of communicating wirelessly or wire-based with a network node. The communication device can communicate with another device or a server through a network using, for example, TCP/IP protocols. Device 800 can utilize the communication device to distribute operations across multiple network devices.

The processors 810 can have access to a memory 850 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 850 can include program memory 860 that stores programs and software, such as an operating system 862, building height calculation system 864, and other application programs 866. Memory 850 can also include data memory 870, LIDAR data, structure data, image data, footprint data, rooftop data, device data, satellite data, machine learning data, vector data, shadow mask data, edge detection data, terrain data, camera data, retrieval data, management data, notification data, configuration data, settings, user options or preferences, etc., which can be provided to the program memory 860 or any element of the device 800.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 9:
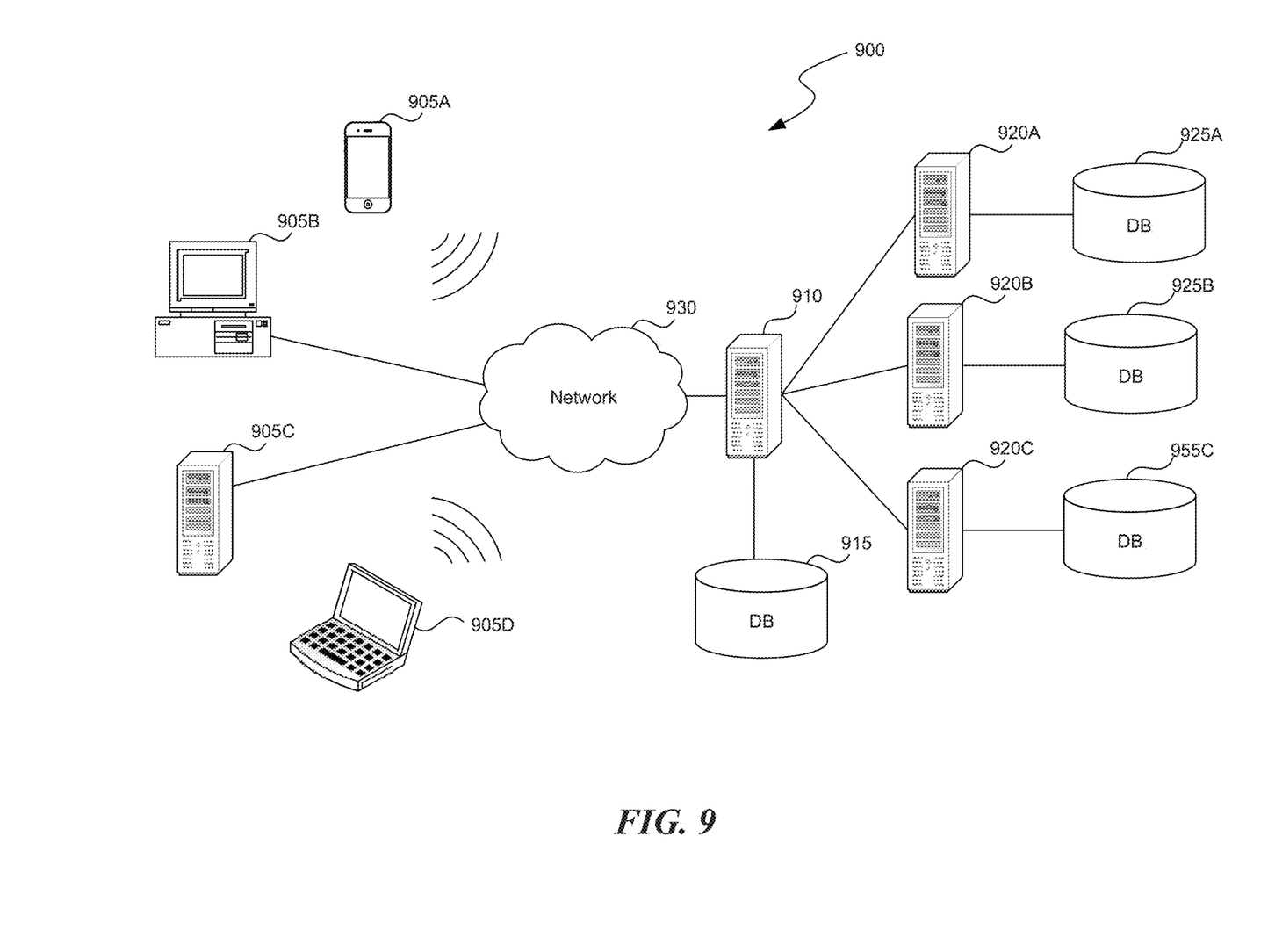
FIG. 9 is a block diagram illustrating an overview of an environment in which some implementations can operate.

FIG. 9 is a block diagram illustrating an overview of an environment 900 in which some implementations of the disclosed technology can operate. Environment 900 can include one or more client computing devices 905A-D, examples of which can include device 800. Client computing devices 905 can operate in a networked environment using logical connections through network 930 to one or more remote computers, such as a server computing device 910.

In some implementations, server 910 can be an edge server which receives client requests and coordinates fulfillment of those requests through other servers, such as servers 920A-C. Server computing devices 910 and 920 can comprise computing systems, such as device 800. Though each server computing device 910 and 920 is displayed logically as a single server, server computing devices can each be a distributed computing environment encompassing multiple computing devices located at the same or at geographically disparate physical locations. In some implementations, each server 920 corresponds to a group of servers.

Client computing devices 905 and server computing devices 910 and 920 can each act as a server or client to other server/client devices. Server 910 can connect to a database 915. Servers 920A-C can each connect to a corresponding database 925A-C. As discussed above, each server 920 can correspond to a group of servers, and each of these servers can share a database or can have their own database. Databases 915 and 925 can warehouse (e.g. store) information such as implement data, LIDAR data, structure data, image data, footprint data, rooftop data, device data, satellite data, camera data, machine learning data, vector data, shadow mask data, edge detection data, and terrain data. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. Network 930 may be the Internet or some other public or private network. Client computing devices 905 can be connected to network 930 through a network interface, such as by wired or wireless communication. While the connections between server 910 and servers 920 are shown as separate connections, these connections can be any kind of local, wide area, wired, or wireless network, including network 930 or a separate public or private network.

Figure 10:
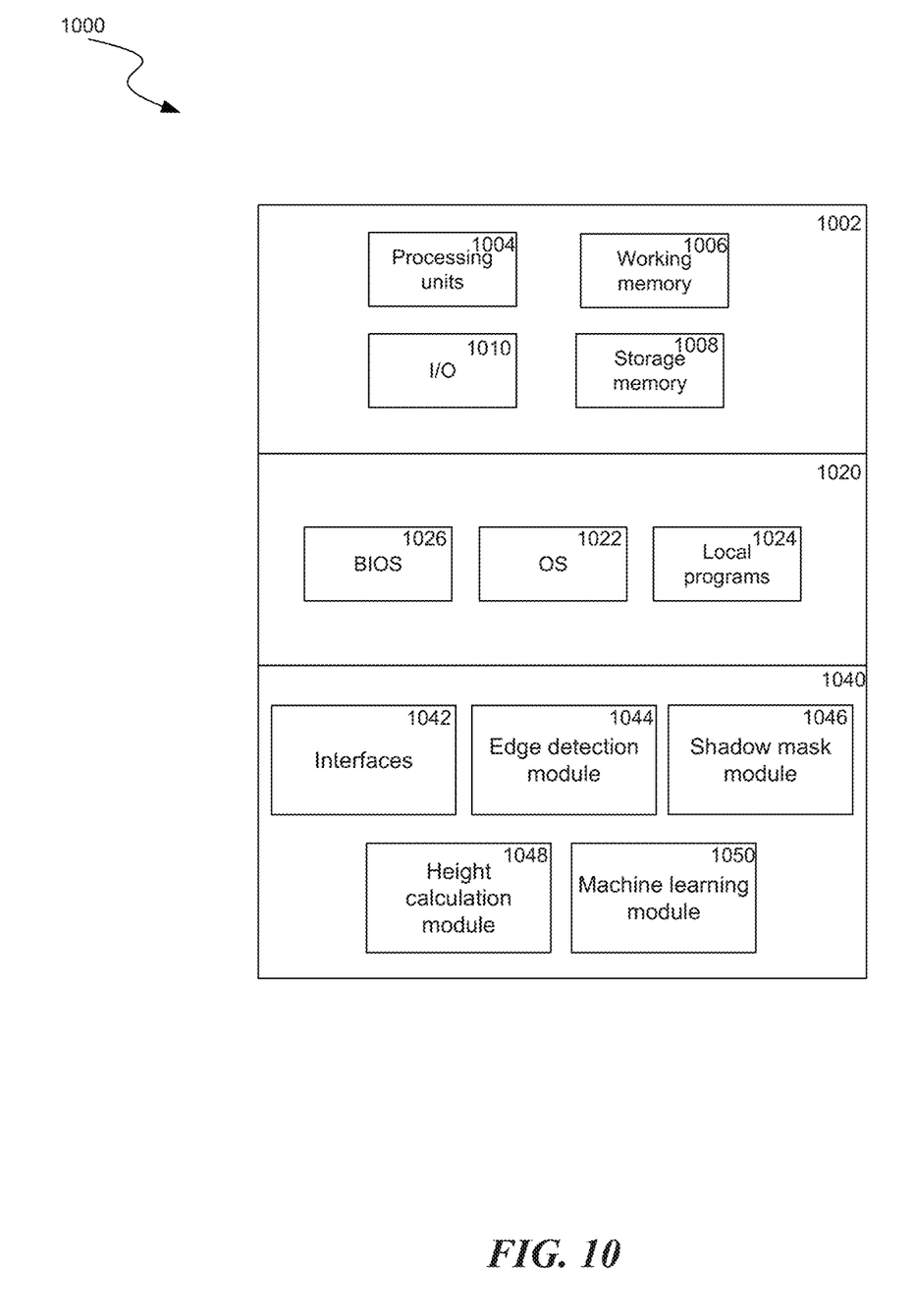
FIG. 10 is a block diagram illustrating components which in some implementations can be used in a system employing the disclosed technology.

FIG. 10 is a block diagram illustrating components 1000 which, in some implementations, can be used in a system employing the disclosed technology. The components 1000 include hardware 1002, general software 1020, and specialized components 1040. As discussed above, a system implementing the disclosed technology can use various hardware including processing units 1004 (e.g. CPUs, GPUs, APUs, etc.), working memory 1006, storage memory 1008 (local storage or as an interface to remote storage, such as storage 915 or 925), and input and output devices 1010. In various implementations, storage memory 1008 can be one or more of: local devices, interfaces to remote storage devices, or combinations thereof. For example, storage memory 1008 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 915 or storage provided through another server 920). Components 1000 can be implemented in a client computing device such as client computing devices 905 or on a server computing device, such as server computing device 910 or 920.

General software 1020 can include various applications including an operating system 1022, local programs 1024, and a basic input output system (BIOS) 1026. Specialized components 1040 can be subcomponents of a general software application 1020, such as local programs 1024. Specialized components 1040 can include edge detection module 1044, shadow mask module 1046, height calculation module 1048, machine learning module 1050, and components which can be used for providing user interfaces, transferring data, and controlling the specialized components, such as interfaces 1042. In some implementations, components 1000 can be in a computing system that is distributed across multiple computing devices or can be an interface to a server-based application executing one or more of specialized components 1040. Although depicted as separate components, specialized components 1040 may be logical or other nonphysical differentiations of functions and/or may be submodules or code-blocks of one or more applications.

In some embodiments, the edge detection module 1044 is configured to execute an edge detection algorithm on the image to identify the edges (e.g., contrast changes) of the building in the image. In some cases, the edges can provide a rooftop vector (e.g., outline of the rooftop of the building) on the building. The edge detection module 1044 can export the edges to a raster file. In some embodiments, the shadow mask module 1046 is configured to create a shadow mask for buildings using the footprint as a reference and the satellite/aerial imagery. The shadow mask module 1046 measures the building heights based on the camera angle, distance from camera to building and the angle of the sun (e.g., using the latitude, longitude and time of day). In some embodiments, the height calculation module 1048 is configured to calculate the building height based on a camera angle, a distance from the camera to the one or more structures, and a pixel offset from the footprint vector to the rooftop vector.

In some embodiments, the machine learning module 1050 is configured to analyze the input data (e.g., image meta data) from the cameras and determine the rooftop vector and the footprint vector of the building. The machine learning module 105 may be configured to determine a footprint vector and/or a rooftop vector based on at least one machine-learning algorithm trained on at least one dataset of rooftop and/or footprint vectors. The at least one machine-learning algorithms (and models) may be stored locally at databases and/or externally at databases. Height calculation devices may be equipped to access these machine learning algorithms and intelligently determine rooftop or footprint vectors based on at least one machine-learning model that is trained on a dataset of building footprint vectors and rooftop vectors. As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process building height databases and other data stores to determine a building footprint or rooftop vector.

Based on building height data and image data from building height databases and platforms and other user data stores, at least one ML model may be trained and subsequently deployed to automatically determine rooftop vectors and footprint vectors and calculate a building height. The trained ML model may be deployed to one or more devices. As a specific example, an instance of a trained ML model may be deployed to a server device and to a client device which communicate with a camera. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with item information, such as specific image or building information. In such examples, the ML model may be locally cached by the client device.

Those skilled in the art will appreciate that the components illustrated in FIGS. 8-10 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:
   receiving, from a camera, an image of terrain with one or more structures;
   orthorectifying the image to remove effects of terrain distortion from the image;
   identifying edges of the one or more structures in the image, wherein the edges provide a rooftop vector on the one or more structures;
   identifying a footprint vector of the one or more structures in the image;
   calculating a structure height of the one or more structures based on a camera angle, a distance from the camera to the one or more structures, and a pixel offset from the footprint vector to the rooftop vector;
   creating a shadow mask for the one or more structures using the footprint vector as a reference;
   measuring a shadow structure height of the one or more structures based on the camera angle, the distance from the camera to the one or more structures and a sun angle; and
   comparing the shadow structure height to the calculated structure height from the pixel offset from the footprint vector to the rooftop vector.

2. The method of claim 1, wherein identifying the edges further comprises:
   identifying contrast changes in the image and exporting the contrast changes to a raster file.

3. The method of claim 1, further comprising:
   calculating a structure lean direction based on image meta data of the camera angle.

4. The method of claim 1, further comprising:
   converting the image into an input for a machine learning model; and
   applying the input to the machine learning model and in response obtaining the rooftop vector and the footprint vector of the one or more structures based on output from the machine learning model.

5. The method of claim 1, further comprising:
   receiving the footprint vector of the one or more structures; and
   scanning an edge raster of the footprint vector to identify a connection between the footprint vector and the edge raster.

6. A computing system comprising:
   at least one processor; and
   at least one memory storing instructions that, when executed by the processor, cause the computing system to perform a process comprising:
   receiving, from a camera, an image of terrain with one or more structures;
   orthorectifying the image to remove effects of terrain distortion from the image;
   identifying edges of the one or more structures in the image, wherein the edges provide a rooftop vector on the one or more structures;
   identifying a footprint vector of the one or more structures in the image;
   calculating a structure height of the one or more structures based on a camera angle, a distance from the camera to the one or more structures, and a pixel offset from the footprint vector to the rooftop vector;
   creating a shadow mask for the one or more structures using the footprint vector as a reference;
   measuring a shadow structure height of the one or more structures based on the camera angle, the distance from the camera to the one or more structures, and a sun angle; and
   comparing the shadow structure height to the calculated structure height from the pixel offset from the footprint vector to the rooftop vector.

7. The computing system of claim 6, wherein the process of identifying the edges further comprises:
   identifying contrast changes in the image and exporting the contrast changes to a raster file.

8. The computing system of claim 6, wherein the process further comprises:
   calculating a structure lean direction based on image meta data of the camera angle.

9. The computing system of claim 6, wherein the process further comprises:
   converting the image into an input for a machine learning model; and
   applying the input to the machine learning model and in response obtaining the rooftop vector and the footprint vector of the one or more structures based on output from the machine learning model.

10. The computing system of claim 6, wherein the process further comprises:
    receiving the footprint vector of the one or more structures; and
    scanning an edge raster of the footprint vector to identify a connection between the footprint vector and the edge raster.

11. An apparatus comprising:
    a memory;
    one or more processors electronically coupled to the memory and configured for:
    receiving, from a camera, an image of terrain with one or more structures;
    orthorectifying the image to remove effects of terrain distortion from the image;
    identifying edges of the one or more structures in the image, wherein the edges provide a rooftop vector on the one or more structures;
    identifying a footprint vector of the one or more structures in the image;

calculating a structure height of the one or more structures based on a camera angle, a distance from the camera to the one or more structures, and a pixel offset from the footprint vector to the rooftop vector;

creating a shadow mask for the one or more structures using the footprint vector as a reference;

measuring a shadow structure height of the one or more structures based on the camera angle, the distance from the camera to the one or more structures, and a sun angle; and comparing the shadow structure height to the calculated structure height from the pixel offset from the footprint vector to the rooftop vector.

12. The apparatus of claim 11, wherein the one or more processors are further configured for:

identifying contrast changes in the image and exporting the contrast changes to a raster file.

13. The apparatus of claim 11, wherein the one or more processors are further configured for:

calculating a structure lean direction based on image meta data of the camera angle.

14. The apparatus of claim 11, wherein the one or more processors are further configured for:

converting the image into an input for a machine learning model; and applying the input to the machine learning model and in response obtaining the rooftop vector and the footprint vector of the one or more structures based on output from the machine learning model.

15. The apparatus of claim 11, wherein the one or more processors are further configured for:

receiving the footprint vector of the one or more structures; and scanning an edge raster of the footprint vector to identify a connection between the footprint vector and the edge raster.

* * * * *